United States Patent [19]

Uttecht et al.

[11] Patent Number: 4,800,981
[45] Date of Patent: Jan. 31, 1989

[54] STABILIZED REFERENCE GEOPHONE SYSTEM FOR USE IN DOWNHOLE ENVIRONMENT

[75] Inventors: Gary W. Uttecht; Danny E. Hoover; Stephen W. Klopp, all of Houston, Tex.

[73] Assignee: Gyrodata, Inc., Houston, Tex.

[21] Appl. No.: 96,138

[22] Filed: Sep. 11, 1987

[51] Int. Cl.⁴ .............................................. G01V 1/40
[52] U.S. Cl. ..................................... 181/104; 367/25; 367/33; 367/911; 33/313
[58] Field of Search ...................... 181/104, 102, 112; 367/25, 33, 911, 912; 73/151, 152; 33/304, 313, 318

[56] References Cited

U.S. PATENT DOCUMENTS

| | | | |
|---|---|---|---|
| 3,475,722 | 10/1969 | White | 181/104 |
| 4,192,077 | 3/1980 | Van Steenwyk et al. | 33/313 |
| 4,197,654 | 4/1980 | Van Steenwyk et al. | 33/304 |
| 4,199,869 | 4/1980 | Van Steenwyk | 33/302 |
| 4,265,028 | 5/1981 | Van Steenwyk | 33/304 |
| 4,293,046 | 10/1981 | Van Steenwyk | 125/45 |
| 4,297,790 | 11/1981 | Van Steenwyk | 33/313 |
| 4,362,054 | 12/1982 | Ringot | 364/422 |
| 4,433,491 | 2/1984 | Van Steenwyk et al. | 33/302 |
| 4,461,088 | 7/1984 | Van Steenwyk | 33/304 |
| 4,524,433 | 6/1985 | Broding | 181/105 |
| 4,534,020 | 8/1985 | O'Brien | 367/911 |
| 4,542,487 | 9/1985 | Beuzing et al. | 367/911 |
| 4,611,405 | 9/1986 | Van Steenwyk | 33/304 |
| 4,648,039 | 3/1987 | Devaney et al. | 367/47 |
| 4,706,224 | 11/1987 | Alford | 367/41 |

OTHER PUBLICATIONS

LRS-1023 Triaxial Borehole Geophone, Litton Resources System Brochure, 1984.

Primary Examiner—Thomas H. Tarcza
Assistant Examiner—Ian J. Lobo
Attorney, Agent, or Firm—Gunn, Lee & Jackson

[57] ABSTRACT

For seismic exploration, a method and apparatus are set forth wherein geophones, preferably arranged in XYZ relationship to one another fixedly within a hermetically sealed housing, are located in a deviated well. The position of the housing with respect to a reference such as the earth's north axis is determined. This reference enables determination of the geophone location and the direction of propagation of seismic impulse.

8 Claims, 1 Drawing Sheet

STABILIZED REFERENCE GEOPHONE SYSTEM FOR USE IN DOWNHOLE ENVIRONMENT

BACKGROUND OF THE DISCLOSURE

The present disclosure is directed to a particular kind of geophone spread and more particularly a set of geophones adapted to be used in a downhole enironment. Ordinarily, seismic data is collected by placing a shock or impulse source on the surface, creating a shock wave which is propagated through the earth, reflected from underground horizons, and detecting small signals for recordation from a geophone spread. The typical geophone spread includes any number of geophones which are placed on the ground. The several geophones are connected by long cable to truck located equipment which includes individual geophone amplifiers, data or signal conditioning circuits, and a recorder with a timing reference placed on the recorded data.

In the past, geophones have also been placed in a well borehole near a spread of geophones. Sometimes, the geophones may be placed in the well borehole simultaneously with recording data from surface located geophones. Sometimes, the data can be collected on two different shots so that the data observed downhole is obtained prior to or after the collection of data from the geophone spread.

It is necessary to provide a reference which is affixed to the geophones so that the orientation in space and location along the borehole can be determined. If this orientation cannot be determined, then the data obtained from the geophones may be difficult to fix in space relative to the adjacent formations.

The present apparatus and methods set forth a means and procedure for determining location of the geophones in any vertical or deviated well. The present invention apparatus contemplates the attachment of a reference determining system to the geophone apparatus. The geophones are thus placed in a hermetically sealed housing. This protects the geophones from invasion of drilling fluid. This housing is attached to another housing which defines a north seeking reference. The north seeking reference is constructed with and made of a north seeking gyroscope and cooperative accelerometer system. Thus, the equipment may "tumble" as it moves to any relative orientation in the well. Even though it may take any angular position in space, it is not blind to its orientation. That is, it is able to locate its orientation relative to a particular reference system (north of the earth in this instance) and is therefore able to provide a azimuthal reference relative to the set of geophones.

Geophones however are extremely sensitive devices. That is, they are built to receive extremely small vibrations traveling long distances through the earth and provide electrical signals indicative of such vibrations. The present invention thus incorporates a gyroscope system which is able to be switched off completely. When it is off, data can then be recorded. The gyroscope is then switched on, brought to operating speed, locates north as a reference, and provides an indication of the orientation in space of the gyroscope relative to the reference. In turn, this reference information defines the orientation of the geophones in the equipment. When the geophones are oriented, the data obtained by the geophones can then be properly related to the seismic source and formations of interest. This enables precise determination of the three dimensional position and orientation of the geophones in the well and proper correlation between the data obtained from geophones in the borehole.

The present apparatus is preferably constructed as a single unit adapted to be lowered on a cable having conductors therein. The equipment includes a telemetry section which properly conditions the signals for transmittal to the surface along the cable. An XYZ geophone system is also included. The apparatus includes a stable platform having the form of a gyroscope. This particular gyroscope is the type which can be switched off and on, yet when switched on, can locate a particular reference, preferably north, thereby providing a reference whereby the instrument can be located and orientation determined in the borehole. The logging cable that connects with this apparatus extends to the surface and the depth of the cable in the well is measured also. The various measurements enable precise location and orientation of the geophones so that the relative location of the instrument in the borehole can be properly correlated with other known measurements.

DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 shows the instrument of the present invention suspended on a logging cable in a well borehole adjacent to several formations subject to seismic mapping and further including a spread of geophones wich a source of seismic energy for making a seismic survey; and FIG. 2 is an enlarged view of the present invention in an open well bore further including three dimensional references for descriptive purposes of the present apparatus.

DETAILED DESCRIPTION OF THE PREFERRED EMBODIMENT

Figure 1:
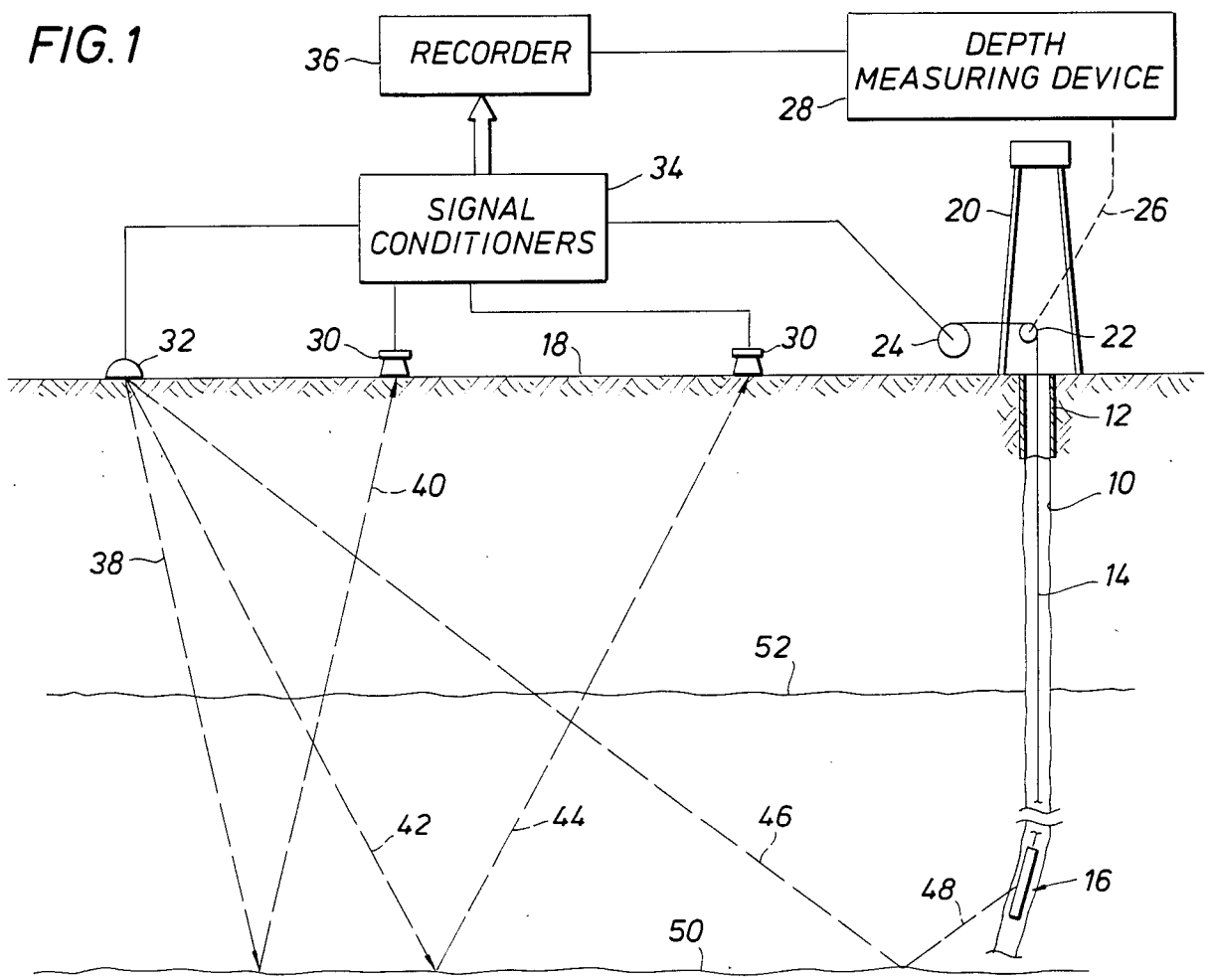

Attention is first directed to FIG. 1 of the drawings where a well borehole 10 is identified. It is cased for some distance by casing 12, although the depth can be varied. A logging cable 14 including conductors is lowered into the borehole 10. The logging cable supports the present apparatus 16 which is a sonde enclosing certain equipment as will be described. The sonde 16 is shown in open and cased hole and can be used in either type hole. Moreover, the hole may be vertical or deviated to exemplify the typical problems encountered in determining location of the geophones to be described. The depth of the well and the deviation can vary widely so that the present apparatus can be used substantially in any type of well.

A derrick 20 is shown above the well 10. It is incorporated so that continued drilling can be conducted after the survey. Alternatively, the derrick can be removed and the present survey can be conducted in a completed and completely cased well. The logging cable 14 passes over a sheave 22 and is spooled onto a reel 24. The depth of the tool 16 in the well is determined by making a mechanical or electronic connection 26 from the sheave 22 to a depth measuring device 28. This forms an output signal indicative of the depth of the tool 16 in the well 10. The derrick 20 is supported on the adjacent land surface 18 although it will be appreciated that the present apparatus can be used at an offshore location. More will be noted concerning this hereinafter.

The numeral 30 identifies one or more geophones which are spread across the surface typically arranged in a line and typically forming what is known as a geophone spread. It is not uncommon to have as many as 16 geophones in a spread. They are typically spread at spaced locations so that they obtain data from a number of locations for enhanced signal processing. The geophones 30 record seismic reflections in a known fashion from a seismic energy source 32. Again the present system can be used with no geophone spread on the surface, and all seismic data is obtained solely from the sonde 16. The energy source 32 can be any type of device including an explosive charge which forms a shock wave, a device which thumps the earth by dropping a weight on the earth, a gas operated explosive device, and continuous signal forming devices, all of which are believed well known in the art. The several seismic geophones form output signals which are furnished to signal conditioners 34 which in turn provide properly formatted data to a recorder 36. The recorder is also provided with the measurements of depth for the sonde enclosing the tool.

In summation regarding the data obtained, the data may be obtained from the seismic spread made up of several geophones 30. That may be obtained simultaneously or may be recorded on another occasion. In addition, data is recorded from the tool 16. This data is preferably correlated with depth measurements from the depth measuring device 28. It is also correlated with the seismic energy pulses from the sources 32.

The foregoing description applies for both onshore and offshore locations. Typically, the only difference is the fact that the geophones 30 are not stationary devices, but they are typically towed devices attached to a long cable behind a small boat. The geophones are deployed along the cable and are pulled behind the boat as the boat traverses the area. In that instance, the well may extend from land or is drilled from an offshore platform such as a fixed platform or various mobile derrick supporting platforms. In any case, FIG. 1 fairly well sets out the context in which the present apparatus is used.

In FIG. 1, the numeral 38 identifies a first seismic energy propagation pathway which goes down to a specific horizon and is reflected along the path 40. Another propagation pathway includes the propagation segments 42 and 44 which returns reflected signals to the surface 18. For purposes of this apparatus, another pathway is identified at 46 and the reflected wave travels along the path 48. Here, it does not travel to the surface; rather, the reflected wave front travels to the sonde 16 for detection. As will be understood, the signal should be much stronger at this depth. Sound amplitude lost as a function of the square of the distance traveled. If the propagation pathway, including segments 42 and 44 is a total of 20,000 feet, the signal loss at the geophone on the surface is quite noticeable. Referring to the signal pathways 38 and 40, it is still almost 20,000 feet in length, and the signal loss is still relatively severe. The pathway 46 and 48 has much larger amplitude at the geophones in the tool 16 because the pathway has been materially shortened. In other words, the device 16 is able to receive larger amplitude signals. Another virtue is reduction of shock wave dispersion to improve signal accuracy. These larger amplitude signals are more readily detected in contrast with the detection requirements essential for geophones at the earth's surface. For this reason, the horizon 50 may be difficult to detect if it is extremely deep. It is much more easily and accurately detected through the use of the present apparatus. In fact, the horizon 50 can be so deep that it might not otherwise be detected by surface located geophones. Various signal enhancing procedures are known to extend the range of the seismic energy impulse, but, nevertheless, there is a limit at which the horizon 50 can be detected. Obviously, a more shallow horizon such as the one indicated at 52 can be detected more readiliy because the total pathway is much shorter.

Figure 2:
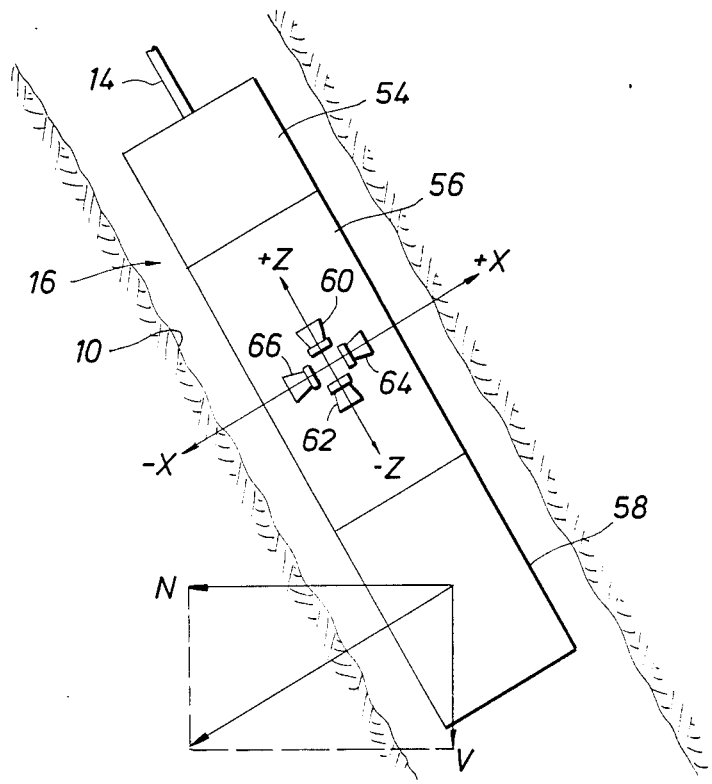

Attention is now directed to FIG. 2 of the drawings. There, the cable 14 is shown connected to the sonde which encloses the tool 16. An upper section incorporates telemetry equipment at 54. This enables transmission of various signals to the surface. The next section is identified by the numeral 56 and incorporates a set of geophones. The geophones are arranged along XYZ axes. They are preferably fixed or gimballed in location relative to the housing. They are preferably fixedly attached to the housing so that the hermetically sealed housing readily transmits all vibrations through the housing to the geophones on the interior. In other words, the interior contains several geophones which are hermetcally protected from external and environmental conditions. Even so, the housing couples vibrations to the geophones on the interior. The numeral 58 identifies an additional section housing which incorporates a stable platform such as a gyroscope as well be described. More will be noted regarding this.

In FIG. 2 of the drawings, a reference system is identified having orthogonal coordinates as references for the several geophones. FIG. 2 shows mutually perpendicular axes X and Z on the plane of the view. The Y axis is perpendicular to the plane of FIG. 2. Each axis has a positive direction for ease of identification. The geophone 60 is arranged along the +Z axis while the numeral 62 identifies another geophones arranged along the −Z axis. Two geophones are shown on the Z axis. It should be observed that they are generally focused in direction of sensitivity. That is, all the geophones have a preferred direction of sensitivity arranged along the respective axes at X, Y and Z. Actually, three geophones might suffice in most circumstances, but two geophones are shown on the Z axis, one focused in the positive direction, the other pointed in the negative direction, so that the two geophones together assure reception of Z axis seismic data. A pair is preferably incorporated on the X axis wherein the geophones 64 and 66 are likewise included and are arranged 180° opposite of one another. In like fashion, Y axis geophones are included. The preferred embodiment thus includes six geophones, the geophones arranged in pairs along the three respective axes. Alternatively, three geophones can be used with only one geophone on each axis.

The several geophones can be idealized at a single point location, namely the origin of the XYZ system. As a practical matter they may be offset ever so slightly from one another, but in view of the scale of the formations to be observed and the depth of the well borehole 10, offset construction of the geophones in the hermetic housing makes no particular difference in data collection. They can still be presumed to be located at a point or origin in the housing.

The geophones are hermetically sealed within the housing described and form output signals. Imagine for the moment that a wave front is propagated toward the set of geophones from some particular location which is off axis to all three of the axes. Signals will be detected in the respective geophones and these signals can be analyzed after transfer to the surface whereby signal amplitude can be determined.

Continuing with FIG. 2, the hermetically closed housing supports a reference determining system. This is fixed in the sonde. It operates relative to three vectors which define a mutually orthonogal system along the directions of north or south, east or west, and vertical. This will be described as the NEV reference system. One gyroscope is known as a rate gyro and is placed in the housing 58. One such rate gyro is exemplified at U.S. Pat. No. 4,297,790. This gyro determines its position with respect to the axis of the earth and is described (based on this virtue) as a north seeking gyro. The gyro thus determines the location of north. As will be understood, if north is located, the east-west reference is also determined. Determination of these two orthogonal directions are specifies the vertical which is the third axis. The three axis system is thus described as the NEV system. The rate gyro is the type of gyro which finds north. It will not find north when it is switched off. This gyro comes up to speed, forms signals which can be resolved to indicate the north direction, and continues to indicate location of north, or the axis of the earth. The measured direction is a particular vector which can be resolved into three vectors with respect to the NEV system in the housing 58. North is determined as an instantaneous value. The north vector can have any position depending on the angular orientation of the housing which is controlled by the deviation of the well and also rotation of the sonde hanging on the logging cable.

The north vector which is determined by the gyro serves as a reference for the geophones. Recall that the geophones are fixed to the housing. Determination of the north direction thus enables a reference to be imposed on the XYZ coordinate system. This reference then locates the particular position of the geophones in the well borehole.

In summary, operation of the present equipment is achieved in the following fashion. First of all, the apparatus shown in FIG. 2 includes the tool 16 is lowered on the cable 14 into a (cased or open hole) well 10. The length of cable between the well head and the tool 10 is measured. Secondly, the present apparatus is operated to obtain an indication of north. The position relative to north is found and forms a signal (typically a vector resolved into one, two or three vector components in space). The reference to the earth's axis is a vector to be resolved and is output in suitable signal fashion such as three resolved vector components. When the instrument is stationary in the well, power can then be switched off so that the gyro is then silent. Since the tool 16 is no longer moving at this juncture, this location is known and fixed. After the gyro has been switched off, seismic data can then be gathered. This data is obtained for each seismic shot or frequency sweep.

Consider an example formation of an impulse by an explosive source at 32 in FIG. 1. A shock wave is propagated through the earth and is observed at various geophones in the near vicinity. Assume that the shock wave is detonated at an initial instant. The geophones are operated for several seconds to detect the received signals at the various geophones. The frequency content is typically rich in measurable frequencies below about 500 hertz as mentioned. The shock wave which propagates from the source 32 is observed at the tool 16 and is particularly observed at the various geophones. The geophone signals are output for storage and analysis. At this point, proper analysis of the geophone output(s) is difficult without knowing precisely where the tool 16 is oriented and located in the well 10. Recall that depth measurements were obtained. Depth measurements will not necessarily translate readily into the specific location of the tool 16 relative to the horizon 50. Moreover, even if that is known, the angular and azimuthal position of the sensitive axes of the geophones may not be fully evident just from geophone signals from three mutually orthogonal geophones. Fortunately, the present invention contemplates determination of a reference such as the earth's axis or north. If that is obtained, along with the depth of the tool 16 in the well 10, then the data or information obtained from the geophones can be properly analyzed. In other words, the precise location of the geophone is determinable. Not only is the location determinable, the particular angular and azimuthal position of the geophones (the XYZ axes of the housing) can be determined. Recall that the XYZ geophone system is defined relative to the housing and that in turn can be determined relative to the earth's axis or some other reference.

Ordinarily, several data points will be obtained. The data points may vary in that the seismic source may be moved while the tool 16 is held stationary. On the other hand, the seismic source 32 may be held stationary and repeated shock waves formed from the seismic source while the sonde 16 is moved in the well 10. In either case, repetitive data points can be obtained. For each data point, the sonde 16 is raised or lowered in the well 10. For each data point, the gyro is switched on to obtain a reference relative to the sonde housing. The gyro is off so that it will be silent during data capture. The gyro is switched susceptible of making noise which might be picked up by the geophones. To this end, it is optimum to switch off the gyro during data capture. Also, the mud pumps are switched off and other equipment located at the well head is also switched off so that background noise is reduced. Recall that the frequency range of interest includes up to about 500 hertz for seismic data. The gyro is switched off to avoid forming noises within this frequency range. Likewise, the mud pumps and other surface located equipment are also switched off to prevent forming noise which is detected at the geophones.

In summary, the present apparatus contemplates a reference determining system which is switched on and off selectively to provide references identifying the location of the housing at a partiuclar depth in the well 10. With this data available, the geophone data is far more useful. For the claims that follow, the term "locate" includes three dimensional orientation in space; also, the determination of "position" includes the concept of three axis location in the well and also three axis orientation in space.

While the foregoing is directed to the preferred embodiment, the scope of the present disclosure is determined by the claims which follow.

We claim:

1. A downhole tool, comprising:
   (a) a tool housing to be lowered in a well borehole wherein said housing defines three mutually orthogonal axes, and including individual geophones in said housing having sensitive axes along the three axes thereof wherein said geophones are momentarily directionally fixedly oriented with respect to said housing for receiving seismic vibrations through the earth from a source located remote from said housing to transmit seismic vibrations through the earth and wherein said geophones form output signals thereof; and
   (b) position means for determining the position of said housing with respect to an orthongal reference system in space when said housing is located in the well borehole wherein a rate gyro forms an output of azimuth relative to north as one axis of the orthogonal reference system and said gyro is operative only when said geophones are not operated.

2. The apparatus of claim 1 wherein said housing incorporates a hermetically sealed sonde adapted to be lowered on a logging cable into a well borehole.

3. The apparatus of claim 1 wherein said axes define an XYZ system and including geophones sensitive along each of X, Y and Z axes.

4. The apparatus of claim 3 wherein said geophones comprise two geophones along each axis facing opposite directions, and said geophones are all received within said closed housing to receive vibrations from the exterior to said geophones.

5. The apparatus of claim 4 wherein said position means includes means located in said housing for determining the position of said housing with respect to the earth's axis of rotation as one axis of the orthogonal reference system.

6. The apparatus of claim 1 wherein said geophones are three orthogonal geophones.

7. The apparatus of claim 1 wherein said axes define an XYZ system and including siz geophones each sensitive along each of $+X$, $-X$, $+Y$, $-Y$, $+Z$ AND $-Z$ axes.

8. A method of obtaining seismic data including the steps of:
   (a) positioning gyro means and orthogonally arranged geophones in a closed housing at a first location in a well borehole;
   (b) determining the location of said housing in said well borehole;
   (c) operating the gyro means to determine the vector represented position of the geophones with respect to an earth based reference while, as a result of operation, creating noise from said gyro means;
   (d) stopping said gyro means to avoid creating noise thereby;
   (e) forming a seismic impulse remote from the well borehole wherein the seismic impulse is propagated through the earth's formations and is observed at the geophones;
   (f) operating said geophones to receive said seismic impulse while the gyro means is stopped; and
   (g) moving said closed housing from the first location to successive locations along the well borehole and repeating steps (b)-(f) at each successive location.

* * * * *